United States Patent
Hyodo et al.

(10) Patent No.: US 11,492,463 B2
(45) Date of Patent: *Nov. 8, 2022

(54) RUBBER COMPOSITION FOR TENNIS BALL AND TENNIS BALL

(71) Applicant: Sumitomo Rubber Industries, Ltd., Hyogo (JP)

(72) Inventors: Takehiko Hyodo, Kobe (JP); Masanori Taguchi, Kobe (JP); Kazuyoshi Shiga, Kobe (JP); Hiroaki Tanaka, Kobe (JP); Kunio Niwa, Kobe (JP); Fumiya Suzuki, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 317 days.

This patent is subject to a terminal disclaimer.

(21) Appl. No.: 16/619,443

(22) PCT Filed: Jun. 29, 2018

(86) PCT No.: PCT/JP2018/024836
§ 371 (c)(1),
(2) Date: Dec. 4, 2019

(87) PCT Pub. No.: WO2019/013019
PCT Pub. Date: Jan. 17, 2019

(65) Prior Publication Data
US 2020/0157321 A1 May 21, 2020

(30) Foreign Application Priority Data

Jul. 14, 2017 (JP) .............................. JP2017-137741
Jul. 14, 2017 (JP) .............................. JP2017-137743

(51) Int. Cl.
| C08L 7/00 | (2006.01) |
| C08K 3/04 | (2006.01) |
| A63B 39/00 | (2006.01) |
| C08K 3/34 | (2006.01) |
| C08K 3/36 | (2006.01) |

(52) U.S. Cl.
CPC ................ *C08L 7/00* (2013.01); *A63B 39/00* (2013.01); *C08K 3/04* (2013.01); *C08K 3/042* (2017.05); *C08K 3/34* (2013.01); *C08K 3/36* (2013.01); *A63B 2039/006* (2013.01); *C08K 2201/003* (2013.01); *C08L 2207/53* (2013.01)

(58) Field of Classification Search
CPC ......... C08L 7/00; C08L 2207/53; C08K 3/04; C08K 3/042; C08K 3/34; C08K 3/36; C08K 2201/003
See application file for complete search history.

(56) References Cited

U.S. PATENT DOCUMENTS

| 6,087,016 A | 7/2000 | Feeney et al. |
| 11,078,348 B2* | 8/2021 | Hyodo .................... C08L 21/00 |
| 2006/0270775 A1* | 11/2006 | Miyazaki .................. C08L 9/00 |
| | | 524/502 |

FOREIGN PATENT DOCUMENTS

| JP | S61-143455 A | 7/1986 |
| JP | 2002-504174 A | 2/2002 |
| JP | 2008-189885 A | 8/2008 |
| JP | 2012-012513 A | 1/2012 |
| JP | 2013-067707 A | 4/2013 |
| WO | 2010/034587 A1 | 4/2010 |

* cited by examiner

Primary Examiner — Edward J Cain
(74) Attorney, Agent, or Firm — Studebaker & Brackett PC (57) ABSTRACT

A rubber composition for a tennis ball includes a base rubber and a filler having a degree of flatness DL of not less than 50, the degree of flatness DL being obtained by dividing an average particle diameter $D_{50}$ (μm) of the filler by an average thickness T (μm) of the filler. An amount of the filler per 100 parts by weight of the base rubber is not less than 1 part by weight and not greater than 150 parts by weight. A gas permeability coefficient GPS and a loss tangent tan δS of the rubber composition and a gas permeability coefficient GPL and a loss tangent tan δL of a rubber composition obtained by replacing the filler with kaolin clay having a degree of flatness DL of 20 satisfy (1): GPL/GPS≥1.02 and (2): |tan δL−tan δS|≤0.03. A tennis ball 2 includes a core 4 formed using the rubber composition.

8 Claims, 1 Drawing Sheet

RUBBER COMPOSITION FOR TENNIS BALL AND TENNIS BALL

TECHNICAL FIELD

The present invention relates to rubber compositions for tennis balls. Specifically, the present invention relates to rubber compositions for tennis balls for use in regulation-ball tennis and tennis balls.

BACKGROUND ART

A tennis ball includes a core formed by crosslinking a rubber composition. The core is a hollow sphere. In a tennis ball for use in regulation-ball tennis, the interior of the core is filled with compressed gas having a pressure that is higher than the atmospheric pressure by 40 kPa to 120 kPa. The tennis ball is also referred to as a pressurized tennis ball (pressure ball).

With a pressurized tennis ball, excellent resilience performance is imparted by the internal pressure of the core, which is higher than the atmospheric pressure. On the other hand, due to the internal pressure of the core being higher than the atmospheric pressure, the filled compressed gas gradually leaks from the core. Due to the leakage of the gas, the internal pressure of the core may decrease to a pressure close to the atmospheric pressure. The tennis ball in which the internal pressure of the core has decreased has inferior resilience performance.

In tennis play, a tennis ball having high resilience performance is advantageous. In addition, in the case of a tennis ball for competition, in light of fairness, the outer shape, the weight, the resilience performance (rebound), etc., thereof are limited within predetermined ranges by the International Tennis Federation. Tennis balls which can maintain appropriate resilience performance over a long period of time are desired.

In JP S61-143455, a rubber material including a scaly or tabular filler is proposed as a material for preventing leakage of gas.

CITATION LIST

Patent Literature

Patent Literature 1: JP S61-143455

SUMMARY OF THE INVENTION

Problems to be Solved by the Invention

In the rubber material disclosed in JP S61-143455, the scaly or tabular filler inhibits permeation of gas and contributes to prevention of leakage of gas. However, depending on the amount of the filler, an obtained core is hardened or increased in weight, and thus resilience performance that satisfies the above-described standard cannot be obtained in some cases. A rubber composition suitable for production of a tennis ball that has appropriate resilience performance and in which leakage of gas is reduced, has not been proposed yet.

An object of the present invention is to provide a rubber composition for a tennis ball and a tennis ball which allow leakage of gas to be reduced without reducing resilience performance.

Solution to the Problems

A rubber composition for a tennis ball according to the present invention includes a base rubber and a filler having a degree of flatness DL of not less than 50, the degree of flatness DL being obtained by dividing an average particle diameter $D_{50}$ (μm) of the filler by an average thickness T (μm) of the filler. An amount of the filler per 100 parts by weight of the base rubber is not less than 1 part by weight and not greater than 150 parts by weight.

According to another aspect, a rubber composition for a tennis ball according to the present invention includes a base rubber and a filler having a degree of flatness DL of not less than 50, the degree of flatness DL being obtained by dividing an average particle diameter $D_{50}$ (μm) of the filler by an average thickness T (μm) of the filler. A nitrogen gas permeability coefficient GPS ($cm^3 \cdot cm/cm^2/sec/cmHg$) of the rubber composition and a loss tangent tan δS at 20° C. of the rubber composition satisfy the following formulas (1) and (2).

$$GPL/GPS \geq 1.02 \qquad (1)$$

In formula (1), GPL is a nitrogen gas permeability coefficient ($cm^3 \cdot cm/cm^2/sec/cmHg$) of a rubber composition obtained by replacing the filler with kaolin clay having a degree of flatness DL of 20.

$$|\tan \delta L - \tan \delta S| \leq 0.03 \qquad (2)$$

In formula (2), tan δL is a loss tangent at 20° C. of a rubber composition obtained by replacing the filler with kaolin clay having a degree of flatness DL of 20.

Preferably, the nitrogen gas permeability coefficient GPS of the rubber composition is not less than $1.0 \times 10^{-12}$ ($cm^3 \cdot cm/cm^2/sec/cmHg$) and not greater than $2.0 \times 10^{-7}$ ($cm^3 \cdot cm/cm^2/sec/cmHg$). Preferably, the loss tangent tan δS at 20° C. of the rubber composition is not less than 0.001 and not greater than 0.150.

Preferably, the filler is an inorganic filler. Preferably, the inorganic filler is selected from the group consisting of talc, kaolin clay, graphite, graphene, bentonite, halloysite, montmorillonite, mica, beidellite, saponite, hectorite, nontronite, vermiculite, illite, and allophane. Preferably, the rubber composition includes a filler having a degree of flatness DL of not less than 100.

A tennis ball according to the present invention includes a hollow core and a felt portion covering the core. The core is formed by crosslinking a rubber composition. The rubber composition includes a base rubber and a filler having a degree of flatness DL of not less than 50, the degree of flatness DL being obtained by dividing an average particle diameter $D_{50}$ (μm) of the filler by an average thickness T (μm) of the filler. An amount of the filler per 100 parts by weight of the base rubber is not less than 1 part by weight and not greater than 150 parts by weight.

According to another aspect, a tennis ball according to the present invention includes a hollow core and a felt portion covering the core. The core is formed by crosslinking a rubber composition. The rubber composition includes a base rubber and a filler having a degree of flatness DL of not less than 50, the degree of flatness DL being obtained by dividing an average particle diameter $D_{50}$ (μm) of the filler by an average thickness T (μm) of the filler. A nitrogen gas permeability coefficient GPS ($cm^3 \cdot cm/cm^2/sec/cmHg$) and a loss tangent tan δS at 20° C. of the rubber composition satisfy the following formulas (1) and (2).

$$GPL/GPS \geq 1.02 \qquad (1)$$

In formula (1), GPL is a nitrogen gas permeability coefficient ($cm^3 \cdot cm/cm^2/sec/cmHg$) of a rubber composition obtained by replacing the filler with kaolin clay having a degree of flatness DL of 20.

$$|\tan \delta L - \tan \delta S| \leq 0.03 \quad (2)$$

In formula (2), tan δL is a loss tangent at 20° C. of a rubber composition obtained by replacing the filler with kaolin clay having a degree of flatness DL of 20.

Advantageous Effects of the Invention

In the rubber composition according to the present invention, the filler having a degree of flatness of not less than 50 is blended in an adequate amount. In a core formed by crosslinking the rubber composition, permeation of gas is effectively inhibited by the filler having a degree of flatness of not less than 50. The rubber composition is suitable for production of a tennis ball that has appropriate resilience performance and in which leakage of gas is reduced.

According to the other aspect, the nitrogen gas permeability coefficient of the rubber composition according to the present invention is appropriate. In the core formed from the rubber composition, permeation of gas is effectively inhibited. The loss tangent at 20° C. of the rubber composition is appropriate. Suitable resilience performance is imparted to a tennis ball by the core formed from the rubber composition. The rubber composition is suitable for production of a tennis ball that has appropriate resilience performance and in which leakage of gas is reduced.

DESCRIPTION OF EMBODIMENTS

The following will describe in detail the present invention based on preferred embodiments with appropriate reference to the drawings.

Figure 1:
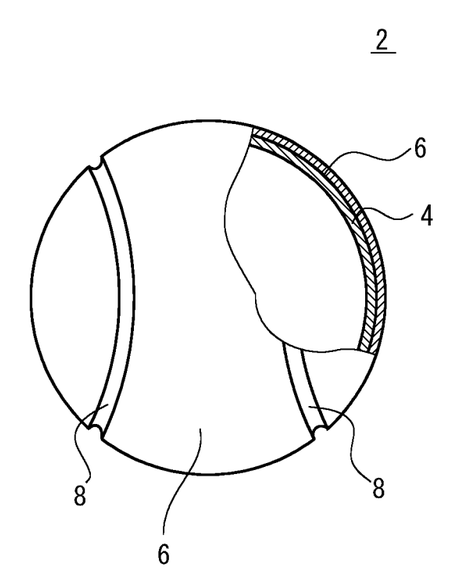
FIG. 1 is a partially cutaway cross-sectional view of a tennis ball according to an embodiment of the present invention.

FIG. 1 is a partially cutaway cross-sectional view of a tennis ball 2 according to an embodiment of the present invention. The tennis ball 2 has a hollow core 4, two felt portions 6 covering the core 4, and a seam portion 8 positioned in the gap between the two felt portions 6. The thickness of the core 4 is normally about 3 mm to 4 mm. The interior of the core 4 is filled with compressed gas. The two felt portions 6 are attached to the surface of the core 4 by an adhesive.

The core 4 is formed by crosslinking a rubber composition. The rubber composition according to the present invention is suitably used for forming the core 4. The following will describe the rubber composition according to the present invention by exemplifying a first embodiment and a second embodiment.

First Embodiment

A rubber composition according to the first embodiment of the present invention includes a base rubber and a filler having a degree of flatness DL of not less than 50, the degree of flatness DL being obtained by dividing an average particle diameter $D_{50}$ (μm) of the filler by an average thickness T (μm) of the filler.

The filler is composed of a large number of flat particles. A vulcanized rubber in which a large number of flat particles are dispersed in a matrix of a rubber component is obtained by crosslinking the rubber composition including the filler. In the vulcanized rubber, the large number of flat particles inhibit movement of gas molecules within the vulcanized rubber.

The effect of inhibiting movement of gas molecules by the flat particles that form the filler having a degree of flatness DL of not less than 50 is great. The gas permeability coefficient of the vulcanized rubber obtained from the rubber composition including the filler is sufficiently low. In the core 4 formed from the vulcanized rubber having a low gas permeability coefficient, leakage of compressed gas is reduced. In the tennis ball 2 including the core 4, a reduction in resilience performance due to leakage of gas is inhibited. The tennis ball 2 can maintain appropriate resilience performance over a long period of time.

In light of reduction of the gas permeability coefficient, a filler having a degree of flatness DL of not less than 70 is preferable, a filler having a degree of flatness DL of not less than 100 is more preferable, a filler having a degree of flatness DL of not less than 140 is further preferable, and a filler having a degree of flatness DL of not less than 200 is particularly preferable. The upper limit of the degree of flatness DL is not particularly limited, but, in light of mixability with the base rubber, the degree of flatness DL is preferably not greater than 1000. When the plurality of flat particles that form the filler are aggregated or multilayered to form an assembly, the degree of flatness DL is calculated from an average particle diameter $D_{50}$ and an average thickness T that are obtained through measurement in a state where the assembly is included.

In the specification of the present application, the average particle diameter $D_{50}$ (μm) means an average particle diameter at a point of 50% by volume accumulated from the small-diameter side in a particle size distribution measured with a laser diffraction particle size distribution measuring instrument (for example, LMS-3000 manufactured by Seishin Enterprise Co., Ltd.). In light of reduction of the gas permeability coefficient, the average particle diameter $D_{50}$ of the filler is preferably not less than 0.1 μm, more preferably not less than 0.5 μm, and particularly preferably not less than 1.0 μm. In light of mixability with the base rubber, the average particle diameter $D_{50}$ is preferably not greater than 50 μm, more preferably not greater than 40 μm, and particularly preferably not greater than 30 μm.

In the specification of the present application, the average thickness T (μm) of the filler is measured by observation with a microscope such as a transmission electron microscope. Specifically, particles having a size similar to the average particle diameter $D_{50}$ of the filler are selected from an image obtained by observing a plurality of particles taken from the filler with a transmission electron microscope (for example, H-9500 manufactured by Hitachi High-Technologies Corporation), and the thicknesses of the particles are measured. The average of measurement values obtained for 12 particles is regarded as the average thickness T of the filler.

In light of effect of the gas permeability coefficient, the average thickness T of the filler is preferably not greater than 1.00 μm, more preferably not greater than 0.50 μm, and particularly preferably not greater than 0.20 μm. In light of mixability with the base rubber, the average thickness T is preferably not less than 0.002 μm, more preferably not less than 0.005 μm, and particularly preferably not less than 0.010 μm.

In the present embodiment, the amount of the filler having a degree of flatness DL of not less than 50, per 100 parts by weight of the base rubber, is not less than 1 part by weight and not greater than 150 parts by weight. In the core 4 formed from the rubber composition in which this amount is not less than 1 part by weight, leakage of gas can be inhibited. From this viewpoint, the amount of the filler having a degree of flatness DL of not less than 50 is preferably not less than 5 parts by weight, more preferably not less than 10 parts by weight, and particularly preferably not less than 15 parts by weight. When this amount is not greater than 150 parts by weight, the base rubber and the filler are easily mixed together. In addition, the core 4 formed from the rubber composition can impart appropriate resilience performance to the tennis ball 2. In light of processability and resilience performance, the amount of the filler having a degree of flatness DL of not less than 50 is preferably not greater than 120 parts by weight, more preferably not greater than 100 parts by weight, and particularly preferably not greater than 80 parts by weight.

The type of the filler is not particularly limited as long as a filler having a degree of flatness DL of not less than 50 is selected, but, in light of processability and reduction of the gas permeability coefficient, an inorganic filler is suitably used. Examples of such an inorganic filler include talc, kaolin clay, graphite, graphene, bentonite, halloysite, montmorillonite, mica, beidellite, saponite, hectorite, nontronite, vermiculite, illite, and allophane. Talc, kaolin clay, graphite, and graphene are more preferable. The rubber composition may include two or more inorganic fillers.

As long as the object of the present invention is not disturbed, the rubber composition can include another filler. Examples of the other filler include particulate fillers such as carbon black, silica, calcium carbonate, magnesium carbonate, and barium sulfate. The degree of flatness DL obtained for the other filler may be less than 50. Normally, the degree of flatness DL obtained for a particulate filler is about 1 to 5.

In the case where a filler having a degree of flatness DL of not less than 50 and another filler are used in combination, in light of reduction of gas permeability, the proportion of the filler having a degree of flatness DL of not less than 50 is preferably not less than 5% by weight, more preferably not less than 10% by weight, and particularly preferably not less than 15% by weight, of the total filler, and may be 100% by weight of the total filler.

Examples of preferable base rubbers include natural rubbers, polybutadienes, polyisoprenes, styrene-butadiene copolymers, acrylonitrile-butadiene copolymers, polychloroprenes, ethylene-propylene copolymers, ethylene-propylene-diene copolymers, isobutylene-isoprene copolymers, and acrylic rubbers. Two or more of these rubbers may be used in combination. Natural rubbers and polybutadienes are more preferable.

A vulcanizing agent, a vulcanization accelerator, and a vulcanization aid are blended as necessary in the rubber composition. Examples of the vulcanizing agent include: sulfurs such as powdery sulfur, insoluble sulfur, precipitated sulfur, colloidal sulfur, and the like; and sulfur compounds such as morpholine disulfide, alkylphenol disulfide, and the like. The amount of the vulcanizing agent is adjusted in accordance with the type thereof. In light of resilience performance, the amount of the vulcanizing agent per 100 parts by weight of the base rubber is preferably not less than 0.5 parts by weight and more preferably not less than 1.0 part by weight. The amount of the vulcanizing agent is preferably not greater than 5.0 parts by weight.

Examples of suitable vulcanization accelerators include guanidine-based compounds, sulfenamide-based compounds, thiazole-based compounds, thiuram-based compounds, thiourea-based compounds, dithiocarbamic acid-based compounds, aldehyde-amine-based compounds, aldehyde-ammonia-based compounds, imidazoline-based compounds, and xanthate-based compounds. In light of resilience performance, the amount of the vulcanization accelerator per 100 parts by weight of the base rubber is preferably not less than 1.0 part by weight and more preferably not less than 2.0 parts by weight. The amount of the vulcanization accelerator is preferably not greater than 6.0 parts by weight.

Examples of the vulcanization aid include fatty acids such as stearic acid and the like, metal oxides such as zinc oxide and the like, fatty acid metal salts such as zinc stearate and the like. The rubber composition may further include additives such as an anti-aging agent, an antioxidant, a light stabilizer, a softener, a processing aid, a coloring agent, and the like as long as the advantageous effects of the present invention are not impaired.

As long as the object of the present invention is achieved, the method for producing the rubber composition according to the present embodiment is not particularly limited. For example, the rubber composition may be produced by: putting the base rubber, the filler, and other chemicals selected as appropriate, into a known kneading machine such as a Banbury mixer, a kneader, a roll, or the like; and kneading these materials therein. The kneading conditions are selected on the basis of the formula of the rubber composition, and the kneading temperature is preferably not lower than 50° C. and not higher than 180° C.

The method for producing the above-described tennis ball 2 by using the rubber composition according to the present embodiment is also not particularly limited. For example, two semi-spherical half shells are formed by vulcanizing and molding the rubber composition in a predetermined mold. The two half shells are attached to each other in a state where an ammonium salt and a nitrite are included in the interior thereof, and then compression molding is performed, whereby the core 4 that is a hollow sphere is formed. Within the core 4, nitrogen gas is generated by chemical reaction of the ammonium salt and the nitrite. By the nitrogen gas, the internal pressure of the core 4 is increased. Next, the felt portions 6 that have been cut in a dumbbell shape and have had seam glue adhered to the cut surfaces thereof are attached to the surface of the core 4, whereby the tennis ball 2 is obtained. The crosslinking conditions for forming the half shells from the rubber composition are selected on the basis of the formula of the rubber composition, and the crosslinking temperature is preferably not lower than 140° C. and not higher than 180° C. The crosslinking time is preferably not shorter than 2 minutes and not longer than 60 minutes.

Second Embodiment

A rubber composition according to the second embodiment of the present invention includes a base rubber and a filler having a degree of flatness DL of not less than 50, the degree of flatness DL being obtained by dividing an average particle diameter $D_{50}$ (μm) of the filler by an average thickness T (μm) of the filler.

The filler is composed of a large number of flat particles. A vulcanized rubber in which a large number of flat particles are dispersed in a matrix of a rubber component is obtained by crosslinking the rubber composition including the filler. Movement of gas molecules within the vulcanized rubber is inhibited by the large number of dispersed flat particles. The effect of inhibiting movement of gas molecules by the flat particles that form the filler having a degree of flatness DL of not less than 50 is great. The gas permeability coefficient of the vulcanized rubber including the filler is sufficiently low.

Furthermore, in the rubber composition according to the present embodiment, a nitrogen gas permeability coefficient GPS ($cm^3 \cdot cm/cm^2/sec/cmHg$) thereof satisfies the following formula (1).

$$GPL/GPS \geq 1.02 \quad (1)$$

In formula (1), GPL is a nitrogen gas permeability coefficient ($cm^3 \cdot cm/cm^2/sec/cmHg$) of a rubber composition obtained by replacing the filler having a degree of flatness DL of not less than 50 with kaolin clay having a degree of flatness DL of 20. In the specification of the present application, the nitrogen gas permeability coefficients GPS and GPL are measured according to the differential-pressure method described in JIS K7126-1. The measurement method will be described in detail later.

In the core 4 formed from the rubber composition that satisfies the above formula (1), leakage of compressed gas is reduced. In the tennis ball 2 including the core 4, a reduction in resilience performance due to leakage of gas is small. In the tennis ball 2, appropriate resilience performance is maintained over a long period of time. From this viewpoint, the ratio (GPL/GPS) of the nitrogen gas permeability coefficient PGL to the nitrogen gas permeability coefficient GPS is preferably not less than 1.05 and more preferably not less than 1.10. The upper limit of the ratio (GPL/GPS) is not particularly limited, but the ratio (GPL/GPS) is preferably not greater than 5.00.

Moreover, in the rubber composition according to the present embodiment, a loss tangent tan δS at 20° C. thereof satisfies the following formula (2).

$$|\tan \delta L - \tan \delta S| \leq 0.03 \quad (2)$$

In formula (2), tan δL is a loss tangent at 20° C. of a rubber composition obtained by replacing the filler having a degree of flatness DL of not less than 50 with kaolin clay having a degree of flatness DL of 20. In the specification of the present application, the loss tangents tan δS and tan δL each mean a value at 20° C. of a temperature dispersion curve of tan δ obtained using a viscoelasticity spectrometer. The measurement method will be described in detail later.

The loss tangent tan δ at 20° C. of the rubber composition correlates with the resilience performance of the core 4 formed from the rubber composition and the tennis ball 2 including this core. In the rubber composition that satisfies the above formula (2), a reduction in resilience performance due to the filler having a degree of flatness DL of not less than 50 is inhibited. Since the core 4 formed from the rubber composition is included, appropriate resilience performance can be imparted to the tennis ball 2. From this viewpoint, the absolute value |tan δL−tan δS| of the difference between the loss tangent tan δL and the loss tangent tan δS is preferably not greater than 0.025, more preferably not greater than 0.010, and ideally 0.

In light of reduction of the gas permeability coefficient, a filler having a degree of flatness DL of not less than 70 is preferable, a filler having a degree of flatness DL of not less than 100 is more preferable, a filler having a degree of flatness DL of not less than 140 is further preferable, and a filler having a degree of flatness DL of not less than 200 is particularly preferable. The upper limit of the degree of flatness DL is not particularly limited, but, in light of mixability with the base rubber, the degree of flatness DL is preferably not greater than 1000. When the plurality of flat particles that form the filler are aggregated or multilayered to form an assembly, the degree of flatness DL is calculated from an average particle diameter $D_{50}$ and an average thickness T that are obtained through measurement in a state where the assembly is included.

The definition of and the measurement method for the average particle diameter $D_{50}$ (μm) are as described above in the first embodiment. In the present embodiment, in light of reduction of the gas permeability coefficient, the average particle diameter $D_{50}$ of the filler is preferably not less than 0.1 μm, more preferably not less than 0.5 μm, and particularly preferably not less than 1.0 μm. In light of mixability with the base rubber, the average particle diameter $D_{50}$ is preferably not greater than 50 μm, more preferably not greater than 40 μm, and particularly preferably not greater than 30 μm.

The average thickness T (μm) of the filler is measured by the method described above in the first embodiment. In light of reduction of the gas permeability coefficient, the average thickness T of the filler is preferably not greater than 1.00 μm, more preferably not greater than 0.50 μm, and particularly preferably not greater than 0.20 μm. In light of mixability with the base rubber, the average thickness T is preferably not less than 0.002 μm, more preferably not less than 0.005 μm, and particularly preferably not less than 0.010 μm.

The nitrogen gas permeability coefficient GPS of the rubber composition is not particularly limited as long as the above-described formula (1) is satisfied, but, in light of prevention of leakage of gas, the GPS is preferably not greater than $2.0 \times 10^{-7}$ ($cm^3 \cdot cm/cm^2/sec/cmHg$), more preferably not greater than $1.0 \times 10^{-8}$ ($cm^3 \cdot cm/cm^2/sec/cmHg$), and particularly preferably not greater than $1.0 \times 10^{-9}$ ($cm^3 \cdot cm/cm^2/sec/cmHg$). In light of resilience performance, the GPS is preferably not less than $1.0 \times 10^{-12}$ ($cm^3 \cdot cm/cm^2/sec/cmHg$).

The loss tangent tan δS at 20° C. of the rubber composition is not particularly limited as long as the above-described formula (2) is satisfied, but, in light of resilience performance, the tan δS is preferably not greater than 0.150, more preferably not greater than 0.125, and particularly preferably not greater than 0.100. In light of reduction of the gas permeability coefficient, the tan δS is preferably not less than 0.001.

In the present embodiment, the amount of the filler having a degree of flatness DL of not less than 50 can be selected as appropriate such that the nitrogen gas permeability coefficient GPS and the loss tangent tan δS at 20° C. of the rubber composition satisfy the above-described formulas (1) and (2). Preferably, the amount of the filler per 100 parts by weight of the base rubber is not less than 1 part by weight and not greater than 150 parts by weight. In the core 4 formed from the rubber composition in which this amount is not less than 1 part by weight, leakage of gas can be inhibited. From this viewpoint, the amount of the filler is preferably not less than 5 parts by weight, more preferably not less than 10 parts by weight, and particularly preferably not less than 15 parts by weight. When this amount is not greater than 150 parts by weight, the base rubber and the filler are easily mixed together. In addition, the core 4 formed from the rubber composition can impart appropriate resilience performance to the tennis ball 2. In light of processability and resilience performance, the amount of the filler is preferably not greater than 120 parts by weight, more preferably not greater than 100 parts by weight, and particularly preferably not greater than 80 parts by weight.

The type of the filler is not particularly limited as long as a filler having a degree of flatness DL of not less than 50 is selected, but, in light of processability and reduction of the gas permeability coefficient, the inorganic filler described above in the first embodiment is suitably used. The rubber composition may include two or more inorganic fillers.

As long as the object of the present invention is not disturbed, the rubber composition according to the present embodiment may include another filler. Examples of the other filler include the particulate fillers described above in the first embodiment. The degree of flatness DL obtained for these fillers may be less than 50. Normally, the degree of flatness DL obtained for a particulate filler is about 1 to 5.

In the case where a filler having a degree of flatness DL of not less than 50 and another filler are used in combination, in light of reduction of gas permeability, the proportion of the filler having a degree of flatness DL of not less than 50 is preferably not less than 5% by weight, more preferably not less than 10% by weight, and particularly preferably not less than 15% by weight, of the total filler, and may be 100% by weight of the total filler.

Examples of preferable base rubbers include the base rubbers described above in the first embodiment. Two or more of these rubbers may be used in combination. Natural rubbers and polybutadienes are more preferable.

The rubber composition can include, as necessary, the vulcanizing agent, the vulcanization accelerator, and the vulcanization aid that have been described above in the first embodiment. The amount of the vulcanizing agent is adjusted in accordance with the type thereof. In light of resilience performance, the amount of the vulcanizing agent per 100 parts by weight of the base rubber is preferably not less than 0.5 parts by weight and more preferably not less than 1.0 part by weight. The amount of the vulcanizing agent is preferably not greater than 5.0 parts by weight.

In light of resilience performance, the amount of the vulcanization accelerator per 100 parts by weight of the base rubber is preferably not less than 1.0 part by weight and more preferably not less than 2.0 parts by weight. The amount of the vulcanization accelerator is preferably not greater than 6.0 parts by weight.

The rubber composition may further include additives such as an anti-aging agent, an antioxidant, a light stabilizer, a softener, a processing aid, a coloring agent, and the like as long as the advantageous effects of the present invention are not impaired.

As long as the object of the present invention is achieved, the method for producing the rubber composition according to the present embodiment is not particularly limited. The method and the conditions described above in the first embodiment can be used.

The method for producing the above-described tennis ball 2 by using the rubber composition according to the present embodiment is also not particularly limited. The method and the conditions described above in the first embodiment can be used.

EXAMPLES

The following will show the effects of the present invention by means of Examples, but the present invention should not be construed in a limited manner on the basis of the description of these Examples.

Experiment A

Example A1

Together with 80 parts by weight of a natural rubber (trade name "SMR CV60"), 20 parts by weight of a polybutadiene rubber (trade name "BR01" of JSR Corporation), 0.51 parts by weight of stearic acid (trade name "Tsubaki" of NOF Corporation), and 5 parts by weight of zinc oxide (trade name "Zinc Oxide II" of SEIDO CHEMICAL INDUSTRY CO., LTD.), 4.99 parts by weight of silica (trade name "Nipsil VN3" of Tosoh Silica Corporation), 15 parts by weight of carbon black (trade name "Show Black N330" of Cabot Japan K.K.), and 56 parts by weight of talc (100) (trade name "Mistron HAR" of IMERYS, degree of flatness: 100) were put as fillers into a Banbury mixer, and the mixture was kneaded at 90° C. for 5 minutes therein. 3.6 parts by weight of sulfur (trade name "Sanfel EX" of SANSHIN CHEMICAL INDUSTRY CO., LTD., containing 20% of oil), 1 part by weight of a vulcanization accelerator DPG (trade name "Sanceler D" of SANSHIN CHEMICAL INDUSTRY CO., LTD.), 1 part by weight of a vulcanization accelerator CZ (trade name "Nocceler CZ" of Ouchi Shinko Chemical Industrial Co., Ltd.), and 1.88 parts by weight of a vulcanization accelerator DM (trade name "Nocceler DM" of Ouchi Shinko Chemical Industrial Co., Ltd.) were added to the obtained kneaded product, and the mixture was kneaded at 50° C. for 3 minutes using an open roll, whereby a rubber composition of Example A1 was obtained.

Examples A2 to A6 and Comparative Examples A1 and A2

Rubber compositions of Examples A2 to A6 and Comparative Examples A1 and A2 were obtained in the same manner as Example A1, except the amount of talc (100) was changed to those shown in Tables A1 and A2. In Comparative Example A2 in which 160 parts by weight of talc (100) was blended, the flowability of the contents decreased and the mixer stopped, and thus a uniform rubber composition was not able to be obtained.

Examples A7 to A9 and Comparative Example A3

Rubber compositions of Examples A7 to A9 and Comparative Example A3 were obtained in the same manner as Example A1, except talc (100) was replaced with kaolin clay (125), graphite (140), graphene (700), and kaolin clay (20), respectively, as shown in Table A3. In Table A3, the rubber composition of Example A1 is shown together for comparison.

Comparative Example A4

A rubber composition of Comparative Example A4 was obtained in the same manner as Example A1, except 56 parts by weight of talc (100) was replaced with 150 parts by weight of kaolin clay (20) as shown in Table A4.

Examples A10 to A13

Rubber compositions of Examples A10 to A13 were obtained in the same manner as Example A7, except carbon black was replaced with graphite (140), graphite (110), graphite (120), and graphene (700), respectively, as shown in Table A4.

[Gas Permeability Evaluation]

Vulcanized rubber sheets each having a thickness of 2 mm were produced by placing each of the rubber compositions of Examples A1 to A13 and Comparative Examples A1, A3, and A4 into a mold and press-vulcanizing the rubber composition at 160° C. for 2 minutes. Nitrogen gas permeability coefficients [$cm^3 \cdot cm/cm^2/sec/cmHg$] of the obtained vulcanized rubber sheets in the thickness direction thereof were measured according to the differential-pressure method described in JIS K7126-1. For the measurement, a gas permeation tester "GTR-30ANI" manufactured by GTR TEC Corporation was used. The measurement conditions were: sample temperature: 40° C., transmission cross-sectional area of a measurement cell: 15.2 cm$^2$, differential pressure: 0.2 MPa, and humidity: 0%. All the measurements were carried out indoors at 23±0.5° C. A ratio to the gas permeability coefficient of Comparative Example A1 is shown as a gas permeability evaluation 1 in Tables A1 and A2. A ratio to the gas permeability coefficient of Comparative Example A3 is shown as a gas permeability evaluation 2 in Tables A3 and A4. The smaller the values of the gas permeability evaluations 1 and 2 are, the higher the ratings are.

[Resilience Performance Evaluation]

Vulcanized rubber sheets each having a thickness of 2 mm were produced by placing each of the rubber compositions of Examples A1 to A13 and Comparative Examples A1, A3, and A4 into a mold and press-vulcanizing the rubber composition at 160° C. for 2 minutes. A loss tangent at 20° C. of a test piece with a width of 4 mm and a length of 20 mm obtained by cutting each vulcanized rubber sheet was measured using a viscoelasticity spectrometer (E4000 manufactured by UBM Co.) in a tensile mode, at an initial strain of 10%, at a frequency of 10 Hz, and with an amplitude of 0.05%. The obtained measurement results are shown as tan δ (20° C.) in Tables A1 to A4 below. The smaller the value is, the higher the rating is.

TABLE 1

Table A1 Results of Evaluation (parts by weight)

|  | Com. Ex. A1 | Ex. A2 | Ex. A3 | Ex. A1 |
|---|---|---|---|---|
| SMR CV60 | 80 | 80 | 80 | 80 |
| BR01 | 20 | 20 | 20 | 20 |
| Stearic acid | 0.51 | 0.51 | 0.51 | 0.51 |
| Zinc oxide | 5 | 5 | 5 | 5 |
| Silica | 4.99 | 4.99 | 4.99 | 4.99 |
| Carbon black | 15 | 15 | 15 | 15 |
| Talc (100) | — | 1 | 25 | 56 |
| Sulfur | 3.6 | 3.6 | 3.6 | 3.6 |
| Vulcanization accelerator DPG | 1 | 1 | 1 | 1 |
| Vulcanization accelerator CZ | 1 | 1 | 1 | 1 |
| Vulcanization accelerator DM | 1.88 | 1.88 | 1.88 | 1.88 |
| Amount of filler | 19.99 | 20.99 | 44.99 | 75.99 |
| Amount of filler having DL of not less than 50 | 0 | 1 | 25 | 56 |
| Gas permeability coefficient (×10$^{-10}$) | 16.0 | 9.96 | 8.21 | 7.42 |
| Gas permeability evaluation 1 | 1.00 | 0.62 | 0.51 | 0.46 |
| tan δ (20° C.) | 0.023 | 0.031 | 0.045 | 0.058 |

TABLE 2

Table A2 Results of Evaluation (parts by weight)

|  | Ex. A4 | Ex. A5 | Ex. A6 | Com. Ex. A2 |
|---|---|---|---|---|
| SMR CV60 | 80 | 80 | 80 | 80 |
| BR01 | 20 | 20 | 20 | 20 |
| Stearic acid | 0.51 | 0.51 | 0.51 | 0.51 |
| Zinc oxide | 5 | 5 | 5 | 5 |
| Silica | 4.99 | 4.99 | 4.99 | 4.99 |
| Carbon black | 15 | 15 | 15 | 15 |
| Talc (100) | 70 | 100 | 150 | 160 |
| Sulfur | 3.6 | 3.6 | 3.6 | 3.6 |
| Vulcanization accelerator DPG | 1 | 1 | 1 | 1 |
| Vulcanization accelerator CZ | 1 | 1 | 1 | 1 |
| Vulcanization accelerator DM | 1.88 | 1.88 | 1.88 | 1.88 |
| Amount of filler | 89.99 | 119.99 | 169.99 | 179.99 |
| Amount of filler having DL of not less than 50 | 70 | 100 | 150 | 160 |
| Gas permeability coefficient (×10$^{-10}$) | 7.14 | 5.88 | 5.93 | — |
| Gas permeability evaluation 1 | 0.45 | 0.37 | 0.37 | — |
| tan δ (20° C.) | 0.062 | 0.070 | 0.083 | — |

TABLE 3

Table A3 Results of Evaluation (parts by weight)

|  | Com. Ex. A3 | Ex. A1 | Ex. A7 | Ex. A8 | Ex. A9 |
|---|---|---|---|---|---|
| SMR CV60 | 80 | 80 | 80 | 80 | 80 |
| BR01 | 20 | 20 | 20 | 20 | 20 |
| Stearic acid | 0.51 | 0.51 | 0.51 | 0.51 | 0.51 |
| Zinc oxide | 5 | 5 | 5 | 5 | 5 |
| Silica | 4.99 | 4.99 | 4.99 | 4.99 | 4.99 |
| Carbon black | 15 | 15 | 15 | 15 | 15 |
| Kaolinaolin clay (20) | 56 | — | — | — | — |
| Talc (100) | — | 56 | — | — | — |
| Kaolin clay (125) | — | — | 56 | — | — |
| Graphite (140) | — | — | — | 56 | — |
| Graphene (700) | — | — | — | — | 56 |
| Sulfur | 3.6 | 3.6 | 3.6 | 3.6 | 3.6 |
| Vulcanization accelerator DPG | 1 | 1 | 1 | 1 | 1 |
| Vulcanization accelerator CZ | 1 | 1 | 1 | 1 | 1 |
| Vulcanization accelerator DM | 1.88 | 1.88 | 1.88 | 1.88 | 1.88 |
| Amount of filler | 75.99 | 75.99 | 75.99 | 75.99 | 75.99 |
| Amount of filler having DL of not less than 50 | 0 | 56 | 56 | 56 | 56 |
| Gas permeability coefficient (×10$^{-10}$) | 9.27 | 7.42 | 6.29 | 5.88 | 4.00 |
| Gas permeability evaluation 2 | 1.00 | 0.80 | 0.68 | 0.63 | 0.43 |
| tan δ (20° C.) | 0.048 | 0.058 | 0.045 | 0.069 | 0.072 |

TABLE 4

Table A4 Results of Evaluation (parts by weight)

|  | Com. Ex. A4 | Ex. A10 | Ex. A11 | Ex. A12 | Ex. A13 |
|---|---|---|---|---|---|
| SMR CV60 | 80 | 80 | 80 | 80 | 80 |
| BR01 | 20 | 20 | 20 | 20 | 20 |
| Stearic acid | 0.51 | 0.51 | 0.51 | 0.51 | 0.51 |
| Zinc oxide | 5 | 5 | 5 | 5 | 5 |
| Silica | 4.99 | 4.99 | 4.99 | 4.99 | 4.99 |
| Carbon black | 15 | — | — | — | — |
| Kaolinaolin clay (20) | 150 | | | | |
| Kaolin clay (125) | — | 56 | 56 | 56 | 56 |

TABLE 4-continued

Table A4 Results of Evaluation (parts by weight)

| | Com. Ex. A4 | Ex. A10 | Ex. A11 | Ex. A12 | Ex. A13 |
|---|---|---|---|---|---|
| Graphite (140) | — | 15 | — | — | — |
| Graphite (110) | — | — | 15 | — | — |
| Graphite (120) | — | — | — | 15 | — |
| Graphene (700) | — | — | — | — | 15 |
| Sulfur | 3.6 | 3.6 | 3.6 | 3.6 | 3.6 |
| Vulcanization accelerator DPG | 1 | 1 | 1 | 1 | 1 |
| Vulcanization accelerator CZ | 1 | 1 | 1 | 1 | 1 |
| Vulcanization accelerator DM | 1.88 | 1.88 | 1.88 | 1.88 | 1.88 |
| Amount of filler | 169.99 | 75.99 | 75.99 | 75.99 | 75.99 |
| Amount of filler having DL of not less than 50 | 0 | 71 | 71 | 71 | 71 |
| Gas permeability coefficient ($\times 10^{-10}$) | 7.41 | 6.08 | 7.29 | 7.11 | 6.21 |
| Gas permeability evaluation 2 | 0.80 | 0.66 | 0.79 | 0.77 | 0.67 |
| tanδ (20° C.) | 0.072 | 0.064 | 0.050 | 0.050 | 0.065 |

The details of the compounds listed in Tables A1 to A4 are as follows.

SMR CV60: a natural rubber

BR01: a polybutadiene rubber of JSR Corporation

Stearic acid: trade name "Tsubaki" of NOF Corporation

Zinc oxide: trade name "Zinc Oxide II" of SEIDO CHEMICAL INDUSTRY CO., LTD.

Silica: trade name "Nipsil VN3" of Tosoh Silica Corporation

Carbon black: trade name "Show Black N330" of Cabot Japan K.K.

Talc (100): trade name "Mistron HAR" of IMERYS, average particle diameter ($D_{50}$): 6.7 μm, average thickness (T): 0.07 μm, degree of flatness (DL): 100

Kaolin clay (20): trade name "ECKALITE 120" of IMERYS, average particle diameter ($D_{50}$): 2.0 μm, average thickness (T): 0.1 μm, degree of flatness (DL): 20

Kaolin clay (125): trade name "Hydrite SB100S" of IMERYS, average particle diameter ($D_{50}$): 1.0 μm, average thickness (T): 0.008 μm, degree of flatness (DL): 125

Graphite (140): trade name "C-THERM-011" of IMERYS, average particle diameter ($D_{50}$): 21 μm, average thickness (T): 0.15 μm, degree of flatness (DL): 140

Graphite (110): trade name "P44" of IMERYS, average particle diameter ($D_{50}$): 17 μm, average thickness (T): 0.15 μm, degree of flatness (DL): 110

Graphite (120): trade name "SFG44" of IMERYS, average particle diameter ($D_{50}$): 24 μm, average thickness (T): 0.2 μm, degree of flatness (DL): 120

Graphene (700): trade name "xGn-M-5" of XG Sciences, Inc., average particle diameter ($D_{50}$): 5.0 μm, average thickness (T): 0.007 μm, degree of flatness (DL): 700

Sulfur: insoluble sulfur, trade name "Sanfel EX", of SANSHIN CHEMICAL INDUSTRY CO., LTD., containing 20% of oil Vulcanization accelerator DPG: 1,3-diphenylguanidine, trade name "Sanceler D", of SANSHIN CHEMICAL INDUSTRY CO., LTD.

Vulcanization accelerator CZ: N-cyclohexyl-2-benzothiazolyl sulfenamide, trade name "Nocceler CZ", of Ouchi Shinko Chemical Industrial Co., Ltd.

Vulcanization accelerator DM: di-2-benzothiazolyl disulfide, trade name "Nocceler DM", of Ouchi Shinko Chemical Industrial Co., Ltd.

As shown in Tables A1 and A2, the gas permeability evaluation 1 of each of the rubber compositions of Examples A1 to A6 including not less than 1 part by weight and not greater than 150 parts by weight of the filler having a degree of flatness of not less than 50 is lower than the gas permeability evaluation 1 of the rubber composition of Comparative Example A1 not including any filler having a degree of flatness of not less than 50. The results demonstrate that the leakage speeds of gas from the rubber sheets obtained by crosslinking the rubber compositions of Examples A1 to A6 are slower than that of Comparative Example A1. In Comparative Example A2 in which 160 parts by weight of the filler having a degree of flatness of not less than 50 was blended, the flowability decreased, and thus a uniform rubber composition was not able to be obtained.

As shown in Tables A3 and A4, the same amount of the filler is blended in the rubber compositions of Comparative Example A3, Example A1, and Examples A7 to A13. The gas permeability evaluation 2 of each of the rubber compositions of Example A1 and Examples A7 to A13 in which the filler having a degree of flatness of not less than 50 was blended is lower than the gas permeability evaluation 2 of the rubber composition of Comparative Example A3 not including any filler having a degree of flatness of not less than 50. The results demonstrate that the leakage speeds of gas from the rubber sheets obtained by crosslinking the rubber compositions of Example A1 and Examples A7 to A13 are slower than that of Comparative Example A2.

As shown in Tables A3 and A4, the gas permeability evaluation 2 of the rubber composition of Example A1 including 56 parts by weight of the filler having a degree of flatness of not less than 50 is equal to that of the rubber composition of Comparative Example A4 including 150 parts by weight of the filler having a degree of flatness of less than 50. The tan δ at 20° C. of the rubber composition of Example A1 is lower than that of Comparative Example A4. Similarly, the gas permeability evaluation 2 of each of the rubber compositions of Examples A7 to A9 including 56 parts by weight of the filler having a degree of flatness of not less than 50 and Examples A10 to A13 including 71 parts by weight of the filler having a degree of flatness of not less than 50, is also lower than that of Comparative Example A4, and the tan δ at 20° C. of each of the rubber compositions of Examples A7 to A9 and Examples A10 to A13 is equal to or lower than that of Comparative Example A4. The results demonstrate that the effect of reducing the gas permeability coefficient by the filler having a degree of flatness of not less than 50 is great and thus a tennis ball whose resilience performance is not impaired is obtained.

As shown in Tables A1 to A4, the rubber compositions of the Examples are highly rated as compared to the rubber compositions of the Comparative Examples. From the evaluation results, advantages of the present invention are clear.

Experiment B

Example B1

Together with 80 parts by weight of a natural rubber (trade name "SMR CV60"), 20 parts by weight of a polybutadiene rubber (trade name "BR01" of JSR Corporation), 0.51 parts by weight of stearic acid (trade name "Tsubaki" of NOF Corporation), and 5 parts by weight of zinc oxide (trade name "Zinc Oxide II" of SEIDO CHEMICAL INDUSTRY CO., LTD.), 4.99 parts by weight of silica (trade name "Nipsil VN3" of Tosoh Silica Corporation), 15 parts by weight of carbon black (trade name "Show Black N330" of Cabot Japan K.K.), and 56 parts by weight of talc (100) (trade name "Mistron HAR" of IMERYS, degree of flatness: 100) were put as fillers into a Banbury mixer, and the mixture was kneaded at 90° C. for 5 minutes therein. 3.6 parts by weight of sulfur (trade name "Sanfel EX" of SANSHIN CHEMICAL INDUSTRY CO., LTD., containing 20% of oil), 1 part by weight of a vulcanization accelerator DPG (trade name "Sanceler D" of SANSHIN CHEMICAL INDUSTRY CO., LTD.), 1 weight of a vulcanization accelerator CZ (trade name "Nocceler CZ" of Ouchi Shinko Chemical Industrial Co., Ltd.), and 1.88 parts by weight of a vulcanization accelerator DM (trade name "Nocceler DM" of Ouchi Shinko Chemical Industrial Co., Ltd.) were added to the obtained kneaded product, and the mixture was kneaded at 50° C. for 3 minutes using an open roll, whereby a rubber composition of Example B1 was obtained.

Examples B2 to B11 and Comparative Examples B1 to B7

Rubber compositions of Examples B2 to B11 and Comparative Examples B1 to B7 were obtained in the same manner as Example B1, except the type and the amount of the filler were changed to those shown in Tables B1 to B4.

[Gas Permeability Measurement]

Vulcanized rubber sheets each having a thickness of 2 mm were produced by placing each of the rubber compositions of Examples B1 to B11 and Comparative Examples B1 to B7 into a mold and press-vulcanizing the rubber composition at 160° C. for 2 minutes. Nitrogen gas permeability coefficients ($cm^3 \cdot cm/cm^2/sec/cmHg$) of the obtained vulcanized rubber sheets in the thickness direction thereof were measured according to the differential-pressure method described in JIS K7126-1. For the measurement, a gas permeation tester "GTR-30ANI" manufactured by GTR TEC Corporation was used. The measurement conditions were: sample temperature: 40° C., transmission cross-sectional area of a measurement cell: 15.2 $cm^2$, and differential pressure: 0.2 MPa. All the measurements were carried out indoors at 23±0.5° C.

The nitrogen gas permeability coefficients obtained for Examples B1 to B11 are shown as GPS in Tables B1 to B4 below. The nitrogen gas permeability coefficients obtained for Comparative Examples B1 to B7 are shown as GPL in Tables B1 to B4 below. GPL/GPS shown in Tables B1 to B4 below is the ratio of the GPS obtained for each Example to the GPL obtained for the corresponding Comparative Example.

[Viscoelasticity Measurement]

Vulcanized rubber sheets each having a thickness of 2 mm were produced by placing each of the rubber compositions of Examples B1 to B11 and Comparative Examples B1 to B7 into a mold and press-vulcanizing the rubber composition at 160° C. for 2 minutes. A loss tangent at 20° C. of a test piece with a width of 4 mm and a length of 20 mm obtained by cutting each vulcanized rubber sheet was measured using a viscoelasticity spectrometer (E4000 manufactured by UBM Co.) in a tensile mode, at an initial strain of 10%, at a frequency of 10 Hz, and with an amplitude of 0.05%. The loss tangents obtained for Examples B1 to B11 are shown as tan δS in Tables B1 to B4 below. The loss tangents obtained for Comparative Examples B1 to B7 are shown as tan δL in Tables B1 to B4 below. |tan δL−tan δS| shown in Tables B1 to B4 below is the absolute value of the difference between the tan δS obtained for each Example and the tan δL for the corresponding Comparative Example.

TABLE 5

Table B1 Results of Evaluation (parts by weight)

| | Com. Ex. B1 | Ex. B1 | Ex. B2 | Com. Ex. B2 | Ex. B3 |
|---|---|---|---|---|---|
| SMR CV60 | 80 | 80 | 80 | 80 | 80 |
| BR01 | 20 | 20 | 20 | 20 | 20 |
| Stearic acid | 0.51 | 0.51 | 0.51 | 0.51 | 0.51 |
| Zinc oxide | 5 | 5 | 5 | 5 | 5 |
| Silica | 4.99 | 4.99 | 4.99 | 4.99 | 4.99 |
| Carbon black | 15 | 15 | 15 | 15 | 15 |
| Kaolin clay (20) | 56 | — | — | 25 | — |
| Talc (100) | — | 56 | — | — | 25 |
| Kaolin clay (125) | — | — | 56 | — | — |
| Sulfur | 3.6 | 3.6 | 3.6 | 3.6 | 3.6 |
| Vulcanization accelerator DPG | 1 | 1 | 1 | 1 | 1 |
| Vulcanization accelerator CZ | 1 | 1 | 1 | 1 | 1 |
| Vulcanization accelerator DM | 1.88 | 1.88 | 1.88 | 1.88 | 1.88 |
| Amount of filler | 75.99 | 75.99 | 75.99 | 44.99 | 44.99 |
| Amount of filler having DL of not less than 50 | 0 | 56 | 56 | 0 | 25 |
| GPS ($\times 10^{-10}$) | — | 7.42 | 6.29 | — | 8.21 |
| GPL ($\times 10^{-10}$) | 9.27 | — | — | 1.03 | — |
| GPL/GPS | 1.00 | 1.25 | 1.47 | 1.00 | 1.25 |
| tanδS (20° C.) | — | 0.058 | 0.045 | — | 0.045 |
| tanδL (20° C.) | 0.048 | — | — | 0.036 | — |
| |tanδS − tanδL| | 0.000 | 0.010 | 0.003 | 0.000 | 0.009 |

TABLE 6

Table B2 Results of Evaluation (parts by weight)

| | Com. Ex. B3 | Ex. B4 | Com. Ex. B4 | Ex. B5 |
|---|---|---|---|---|
| SMR CV60 | 80 | 80 | 80 | 80 |
| BR01 | 20 | 20 | 20 | 20 |
| Stearic acid | 0.51 | 0.51 | 0.51 | 0.51 |
| Zinc oxide | 5 | 5 | 5 | 5 |
| Silica | 4.99 | 4.99 | 4.99 | 4.99 |
| Carbon black | 15 | 15 | 15 | 15 |
| Kaolin clay (20) | 1 | — | 150 | — |
| Talc (100) | — | 1 | — | 150 |
| Sulfur | 3.6 | 3.6 | 3.6 | 3.6 |
| Vulcanization accelerator DPG | 1 | 1 | 1 | 1 |
| Vulcanization accelerator CZ | 1 | 1 | 1 | 1 |
| Vulcanization accelerator DM | 1.88 | 1.88 | 1.88 | 1.88 |
| Amount of filler | 20.99 | 20.99 | 169.99 | 169.99 |
| Amount of filler having DL of not less than 50 | 0 | 1 | 0 | 150 |
| GPS ($\times 10^{-10}$) | — | 9.96 | — | 5.93 |
| GPL ($\times 10^{-10}$) | 11.1 | — | 7.41 | — |
| GPL/GPS | 1.00 | 1.11 | 1.00 | 1.25 |
| tanδS (20° C.) | — | 0.031 | — | 0.083 |
| tanδL (20° C.) | 0.027 | — | 0.072 | — |
| |tanδS − tanδL| | 0.000 | 0.004 | 0.000 | 0.011 |

TABLE 7

Table B3 Results of Evaluation (parts by weight)

| | Com. Ex. B5 | Ex. B6 | Com. Ex. B6 | Ex. B7 |
|---|---|---|---|---|
| SMR CV60 | 80 | 80 | 80 | 80 |
| BR01 | 20 | 20 | 20 | 20 |
| Stearic acid | 0.51 | 0.51 | 0.51 | 0.51 |
| Zinc oxide | 5 | 5 | 5 | 5 |
| Silica | 4.99 | 4.99 | 4.99 | 4.99 |
| Carbon black | 15 | 15 | 15 | 15 |
| Kaolin clay (20) | 71 | — | 5 | — |
| Talc (100) | — | 71 | — | 5 |
| Sulfur | 3.6 | 3.6 | 3.6 | 3.6 |
| Vulcanization accelerator DPG | 1 | 1 | 1 | 1 |
| Vulcanization accelerator CZ | 1 | 1 | 1 | 1 |
| Vulcanization accelerator DM | 1.88 | 1.88 | 1.88 | 1.88 |
| Amount of filler | 90.99 | 90.99 | 24.99 | 24.99 |
| Amount of filler having DL of not less than 50 | 0 | 71 | 0 | 5 |
| GPS ($\times 10^{-10}$) | — | 7.19 | — | 9.14 |
| GPL ($\times 10^{-10}$) | 8.98 | — | 10.9 | — |
| GPL/GPS | 1.00 | 1.25 | 1.00 | 1.19 |
| tanδS (20° C.) | — | 0.062 | — | 0.037 |
| tanδL (20° C.) | 0.051 | — | 0.031 | — |
| \|tanδS − tanδL\| | 0.000 | 0.011 | 0.000 | 0.006 |

TABLE 8

Table B4 Results of Evaluation (parts by weight)

| | Com. Ex. B7 | Ex. B8 | Ex. B9 | Ex. B10 | Ex. B11 |
|---|---|---|---|---|---|
| SMR CV60 | 80 | 80 | 80 | 80 | 80 |
| BR01 | 20 | 20 | 20 | 20 | 20 |
| Stearic acid | 0.51 | 0.51 | 0.51 | 0.51 | 0.51 |
| Zinc oxide | 5 | 5 | 5 | 5 | 5 |
| Silica | 4.99 | 4.99 | 4.99 | 4.99 | 4.99 |
| Kaolin clay (20) | 71 | — | — | — | — |
| Kaolin clay (125) | — | 56 | 56 | 56 | 56 |
| Graphite (140) | — | 15 | — | — | — |
| Graphite (110) | — | — | 15 | — | — |
| Graphite (120) | — | — | — | 15 | — |
| Graphene (700) | — | — | — | — | 15 |
| Sulfur | 3.6 | 3.6 | 3.6 | 3.6 | 3.6 |
| Vulcanization accelerator DPG | 1 | 1 | 1 | 1 | 1 |
| Vulcanization accelerator CZ | 1 | 1 | 1 | 1 | 1 |
| Vulcanization accelerator DM | 1.88 | 1.88 | 1.88 | 1.88 | 1.88 |
| Amount of filler | 75.99 | 75.99 | 75.99 | 75.99 | 75.99 |
| Amount of filler having DL of not less than 50 | 0 | 71 | 71 | 71 | 71 |
| GPS ($\times 10^{-10}$) | — | 6.08 | 7.29 | 7.11 | 6.21 |
| GPL ($\times 10^{-10}$) | 9.28 | — | — | — | — |
| GPL/GPS | 1.00 | 1.53 | 1.27 | 1.30 | 1.49 |
| tanδS (20° C.) | — | 0.064 | 0.050 | 0.050 | 0.065 |
| tanδL (20° C.) | 0.042 | — | — | — | — |
| \|tanδS − tanδL\| | 0.000 | 0.022 | 0.008 | 0.008 | 0.023 |

The details of the compounds listed in Tables B1 to B4 are as follows.

SMR CV60: a natural rubber
BR01: a polybutadiene rubber of JSR Corporation
Stearic acid: trade name "Tsubaki" of NOF Corporation
Zinc oxide: trade name "Zinc Oxide II" of SEIDO CHEMICAL INDUSTRY CO., LTD.
Silica: trade name "Nipsil VN3" of Tosoh Silica Corporation
Carbon black: trade name "Show Black N330" of Cabot Japan K.K.
Talc (100): trade name "Mistron HAR" of IMERYS, average particle diameter ($D_{50}$): 6.7 μm, average thickness (T): 0.07 μm, degree of flatness (DL): 100
Kaolin clay (20): trade name "ECKALITE 120" of IMERYS, average particle diameter ($D_{50}$): 2.0 μm, average thickness (T): 0.1 μm, degree of flatness (DL): 20
Kaolin clay (125): trade name "Hydrite SB100S" of IMERYS, average particle diameter ($D_{50}$): 1.0 μm, average thickness (T): 0.008 μm, degree of flatness (DL): 125
Graphite (140): trade name "C-THERM-011" of IMERYS, average particle diameter ($D_{50}$): 21 μm, average thickness (T): 0.15 μm, degree of flatness (DL): 140
Graphite (110): trade name "P44" of IMERYS, average particle diameter ($D_{50}$): 17 μm, average thickness (T): 0.15 μm, degree of flatness (DL): 110
Graphite (120): trade name "SFG44" of IMERYS, average particle diameter ($D_{50}$): 24 μm, average thickness (T): 0.2 μm, degree of flatness (DL): 120
Graphene (700): trade name "xGn-M-5" of XG Sciences, Inc., average particle diameter ($D_{50}$): 5.0 μm, average thickness (T): 0.007 μm, degree of flatness (DL): 700
Sulfur: insoluble sulfur, trade name "Sanfel EX", of SANSHIN CHEMICAL INDUSTRY CO., LTD., containing 20% of oil
Vulcanization accelerator DPG: 1,3-diphenylguanidine, trade name "Sanceler D", of SANSHIN CHEMICAL INDUSTRY CO., LTD.
Vulcanization accelerator CZ: N-cyclohexyl-2-benzothiazolyl sulfenamide, trade name "Nocceler CZ", of Ouchi Shinko Chemical Industrial Co., Ltd.
Vulcanization accelerator DM: di-2-benzothiazolyl disulfide, trade name "Nocceler DM", of Ouchi Shinko Chemical Industrial Co., Ltd.

[Production of Tennis Ball]

Two half shells were formed by placing the rubber composition of Example B1 into a mold and heating the rubber composition at 150° C. for 4 minutes. A spherical core was formed by putting ammonium chloride, sodium nitrite, and water into one of the half shells, then bonding the half shell to the other half shell, and heating the half shells at 150° C. for 4 minutes. Two felt portions having seam glue adhered to the cut surfaces thereof were attached to the surface of the core, whereby a tennis ball was produced. Similarly, tennis balls were produced using the respective rubber compositions of Examples B2 to B11.

[Measurement of Height of Rebound]

Each of the tennis balls produced using the rubber compositions of Examples B1 to B11 was caused to freely fall from a height of 245 cm onto a concrete floor in an environment with a temperature of 20° C. and a relative humidity of 60% immediately after production, and the height (cm) of bounce (rebound) was measured. As a result of 4 measurements for each tennis ball and calculation of an average of the measured values, the rebound heights of the tennis balls produced from the rubber compositions of Examples B1 to B11 all satisfied the standard (134.62 cm or greater and 147.32 cm) of the International Tennis Federation.

Moreover, each of the tennis balls produced using the rubber compositions of Examples B1 to B11 was stored at room temperature for 30 days under the atmospheric pressure, and then the rebound height was measured by the above-described method. The average of values obtained by 4 measurements for each tennis ball was substantially equal to the rebound height immediately after production.

CONCLUSION

As shown in Tables B1 to B4, the nitrogen gas permeability coefficients GPS and the loss tangents tan δS at 20° C. of the rubber compositions of Examples B1 to B11 all satisfy the above formulas (1) and (2). Tennis balls that have appropriate resilience performance and in which leakage of gas is reduced were able to be produced using these rubber compositions of Examples B1 to B11. From the evaluation results, advantages of the present invention are clear.

INDUSTRIAL APPLICABILITY

The rubber composition described above can also be applied to production of various hollow balls filled with compressed gas.

DESCRIPTION OF THE REFERENCE CHARACTERS

2 . . . tennis ball
4 . . . core
6 . . . felt portion
8 . . . seam portion

The invention claimed is:

1. A rubber composition for a tennis ball, the rubber composition including a base rubber and a filler having a degree of flatness DL of not less than 100 and not greater than 700, the degree of flatness DL being obtained by dividing an average particle diameter $D_{50}$ (μm) of the filler by an average thickness T (μm) of the filler, wherein
an amount of the filler per 100 parts by weight of the base rubber is not less than 1 part by weight and not greater than 150 parts by weight, and
the average thickness T (μm) of the filler is not less than 0.005 μm and not greater than 1.00 μm.

2. A rubber composition for a tennis ball, the rubber composition including a base rubber and a filler having a degree of flatness DL of not less than 100 and not greater than 700, the degree of flatness DL being obtained by dividing an average particle diameter $D_{50}$ (μm) of the filler by an average thickness T (μm) of the filler, wherein
a nitrogen gas permeability coefficient GPS ($cm^3 \cdot cm/cm^2/sec/cmHg$) of the rubber composition and a loss tangent tan δS at 20° C. of the rubber composition satisfy the following formulas (1) and (2):

$$GPL/GPS \geq 1.02 \quad (1)$$

wherein GPL is a nitrogen gas permeability coefficient ($cm^3 \cdot cm/cm^2/sec/cmHg$) of a rubber composition obtained by replacing the filler with kaolin clay having a degree of flatness DL of 20; and $$|\tan \delta L - \tan \delta S| \leq 0.03 \quad (2)$$

wherein tan δL is a loss tangent at 20° C. of a rubber composition obtained by replacing the filler with kaolin clay having a degree of flatness DL of 20, and the average thickness T (μm) of the filler is not less than 0.005 μm and not greater than 1.00 μm.

3. The rubber composition according to claim 2, wherein the nitrogen gas permeability coefficient GPS is not less than $1.0 \times 10^{-12}$ ($cm^3 \cdot cm/cm^2/sec/cmHg$) and not greater than $2.0 \times 10^{-7}$ ($cm^3 \cdot cm/cm^2/sec/cmHg$).

4. The rubber composition according to claim 2, wherein the loss tangent tan δS at 20° C. is not less than 0.001 and not greater than 0.150.

5. The rubber composition according to claim 1, wherein the filler is an inorganic filler.

6. The rubber composition according to claim 1, wherein the inorganic filler is selected from the group consisting of talc, kaolin clay, graphite, graphene, bentonite, halloysite, montmorillonite, mica, beidellite, saponite, hectorite, nontronite, vermiculite, illite, and allophane.

7. A tennis ball comprising a hollow core and a felt portion covering a surface of the core, wherein
the core is formed by crosslinking a rubber composition,
the rubber composition includes a base rubber and a filler having a degree of flatness DL of not less than 100 and not greater than 700, the degree of flatness DL being obtained by dividing an average particle diameter $D_{50}$ (μm) of the filler by an average thickness T (μm) of the filler, and
an amount of the filler per 100 parts by weight of the base rubber is not less than 1 part by weight and not greater than 150 parts by weight, and
the average thickness T (μm) of the filler is not less than 0.005 μm and not greater than 1.00 μm.

8. A tennis ball comprising a hollow core and a felt portion covering a surface of the core, wherein
the core is formed by crosslinking a rubber composition,
the rubber composition includes a base rubber and a filler having a degree of flatness DL of not less than 100 and not greater than 700, the degree of flatness DL being obtained by dividing an average particle diameter $D_{50}$ (μm) of the filler by an average thickness T (μm) of the filler, and
a nitrogen gas permeability coefficient GPS ($cm^3 \cdot cm/cm^2/sec/cmHg$) of the rubber composition and a loss tangent tan δS at 20° C. of the rubber composition satisfy the following formulas (1) and (2):

$$GPL/GPS \geq 1.02 \quad (1)$$

wherein GPL is a nitrogen gas permeability coefficient ($cm^3 \cdot cm/cm^2/sec/cmHg$) of a rubber composition obtained by replacing the filler with kaolin clay having a degree of flatness DL of 20; and $$|\tan \delta L - \tan \delta S| \leq 0.03 \quad (2)$$

wherein tan δL is a loss tangent at 20° C. of a rubber composition obtained by replacing the filler with kaolin clay having a degree of flatness DL of 20, and
the average thickness T (μm) of the filler is not less than 0.005 μm and not greater than 1.00 μm.

* * * * *